US009716615B1

(12) United States Patent
Grosser et al.

(10) Patent No.: US 9,716,615 B1
(45) Date of Patent: Jul. 25, 2017

(54) APPARATUS AND METHOD FOR NETWORK RING RESILIENCY, AVAILABILITY AND PERFORMANCE

(71) Applicants: Donald B. Grosser, Apex, NC (US); Shankara Ramamurthy, Chennai (IN)

(72) Inventors: Donald B. Grosser, Apex, NC (US); Shankara Ramamurthy, Chennai (IN)

(73) Assignee: Extreme Networks, Inc., San Jose, CA (US)

( * ) Notice: Subject to any disclaimer, the term of this patent is extended or adjusted under 35 U.S.C. 154(b) by 451 days.

(21) Appl. No.: 13/864,091

(22) Filed: Apr. 16, 2013

(51) Int. Cl.
*H04L 12/26* (2006.01)
*H04L 12/24* (2006.01)

(52) U.S. Cl.
CPC ............................. *H04L 41/0654* (2013.01)

(58) Field of Classification Search
CPC ... H04J 2203/006; H04J 3/085; H04L 12/437; H04L 12/423; H04L 49/102; H04L 41/0654; H04L 2012/5627; H04L 45/28
See application file for complete search history.

(56) References Cited

U.S. PATENT DOCUMENTS

| 2005/0073963 | A1* | 4/2005  | Goodfellow ............ H04L 45/12 370/255 |
| 2008/0239943 | A1* | 10/2008 | Hauenstein et al. .......... 370/216 |
| 2008/0279106 | A1* | 11/2008 | Goodfellow ............ H04L 45/12 370/238 |
| 2010/0290367 | A1* | 11/2010 | Karandikar et al. .......... 370/256 |
| 2010/0290472 | A1* | 11/2010 | Raman et al. ............. 370/395.2 |
| 2011/0075554 | A1* | 3/2011  | Holness ........................ 370/228 |
| 2011/0249551 | A1* | 10/2011 | Rollins ........................ 370/222 |
| 2011/0258346 | A1* | 10/2011 | Said et al. .................... 709/249 |
| 2012/0063312 | A1* | 3/2012  | Sarwar et al. ............... 370/235 |
| 2012/0230325 | A1* | 9/2012  | Haddock ...................... 370/357 |
| 2012/0230344 | A1* | 9/2012  | Haddock ...................... 370/401 |
| 2012/0243552 | A1* | 9/2012  | Goodfellow ............ H04L 45/12 370/419 |
| 2012/0250499 | A1* | 10/2012 | Osswald et al. .............. 370/221 |
| 2013/0064102 | A1* | 3/2013  | Chang et al. ................. 370/244 |
| 2014/0211607 | A1* | 7/2014  | Li et al. ........................ 370/219 |
| 2015/0023362 | A1* | 1/2015  | Haddock ...................... 370/401 |

\* cited by examiner

*Primary Examiner* — Hassan Phillips
*Assistant Examiner* — Prenell Jones
(74) *Attorney, Agent, or Firm* — Ropes & Gray LLP

(57) ABSTRACT

A network comprises a plurality of switches coupled in a ring topology, wherein each adjacent pair of switches in the plurality of switches forms a multiple link aggregation group interswitch connection therebetween and forms a ring resiliency protocol logical node. A first switch in a first adjacent pair of the plurality of switches is coupled via a first link to a second switch in a second adjacent pair of the plurality of switches, and a third switch in the first adjacent pair is coupled via a second link to a fourth switch in the second adjacent pair. In the event of a failure of the first link, a packet flow to be transmitted from the first switch over the first link is redirected from the first switch to the third switch for transmission over the second link to the fourth switch. However, in the event of a concurrent failure of the first link and the second link, a ring resiliency protocol reconfigures the ring topology such that a packet flow to be transmitted via the failed links is redirected to a fifth switch in a third adjacent pair via a third link.

17 Claims, 7 Drawing Sheets

APPARATUS AND METHOD FOR NETWORK RING RESILIENCY, AVAILABILITY AND PERFORMANCE

TECHNICAL FIELD

Embodiments of the present invention relate to a data communications network. In particular, embodiments of the present invention relate to improving ring resiliency, availability, and performance, in a network employing link aggregation techniques.

BACKGROUND ART

Link aggregation, or LAG (link aggregation group) is a computer networking term to describe various methods of combining, that is, aggregating or grouping, multiple physical network links in parallel to increase throughput beyond what a single link could sustain, and to provide redundancy in case one of the parallel links fails. LAG allows bonding two or more physical links into a logical link, for example, between two switches, or between a server and a switch such that a Media Access Control (MAC) client can treat the LAG as if it were a single link.

Link aggregation, or a link aggregation group (LAG), may also be referred to as port trunking, link bundling, Ethernet/network/Network Interface Controller (NIC) bonding, or NIC teaming, and encompasses vendor-independent standards such as the Link Aggregation Control Protocol (LACP) for Ethernet defined in IEEE 802.1ax or IEEE 802.3ad, as well as various proprietary solutions.

Multiple Link Aggregation Group, also referred to as Multi-Switch LAG, or as Multi-Chassis LAG, and hereinafter referred to simply as MLAG, adds node-level redundancy to the normal link-level redundancy that a LAG provides. This allows two or more nodes to share a common LAG endpoint. The multiple nodes at the common endpoint present a single logical LAG to the remote end of the aggregated link. Currently, MLAG is vendor-specific, and is not covered by a standard, such as an IEEE standard.

The assignee of the present invention, Extreme Networks, Inc., offers a proprietary layer-2 ring resiliency protocol known as Ethernet Automatic Protection Switching (EAPS) that provides for loop-free operation and very fast ring recovery in the event of a link failure. Other vendors have developed similar protocols, such as Ethernet Protection Switching Ring (EPSR), Rapid Ring Protection Protocol (RRPP), ZTE Ethernet Smart Ring (ZESR). Further, Ethernet Ring Protection Switching, or ERPS, is an effort at ITU-T under the G.8032 Recommendation to provide similar protection and recovery switching for Ethernet traffic in a ring topology and at the same time ensure that there are no loops formed at the Ethernet layer. These protocols are referred to hereafter as fault tolerant ring topology protocols, or simply, ring resiliency protocols. When a ring resiliency protocol, such as EAPS, and MLAG are deployed together in a network, some of the benefits of MLAG are not realized, such as:

1.) The MLAG Inter Switch Connection (ISC) links are generally not used in steady state operation (that is, when no failures occur in the ring) for unicast traffic as MLAG favors local switching. However, when a ring resiliency protocol, such as EAPS, is also configured and in use, the ISC link ports are also the ring resiliency protocol (EAPS) ring ports which can defeat this MLAG benefit; and 2.) The number of hops through the network, and the associated latency increase, can double due to having 2 MLAG peer switches per location in a resilient ring, that is, in a ring in which a ring resiliency protocol is operating, such as an EAPS ring.

FIG. 1 illustrates an exemplary network topology 100 in which both link aggregation, e.g., MLAG, and ring resiliency, e.g., EAPS, protocols are deployed. The topology comprises four sites 110, 120, 130 and 140. Each site has multiple nodes that can be sources or targets for data packet flows. For example, site 120 includes nodes 121 and 122 that can send and receive data packet flows to or from the network. Nodes 121 and 122 could be end user nodes or edge switches in the network. FIG. 1 illustrates a single packet flow starting at source node 122 at site 120 and traversing from site 120 to site 140, in network 100. In the example topology, ring node 146 is the ring resiliency protocol (e.g., EAPS) master node, while all other ring nodes 115, 116, 125, 126, 135, 136, and 145, are ring resiliency protocol transit nodes. Aggregated link 156 is blocked as depicted at 170 by the ring resiliency protocol. Thus, as illustrated by arrows 131-139, packets received by source node 122 at site 120 that hash to switch 120 and that are destined to site 140 must traverse 7 ring nodes 125, 126, 115, 116, 135, 136 and 145, including traversing 3 inter-switch communication (ISC) links 160, 162, and 164, as well as aggregated links 150, 152 and 154. This generally requires extra provisioning and, thus, cost in the network.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DESCRIPTION OF THE EMBODIMENTS

Embodiments of the invention combine aspects of a ring resiliency protocol such as the Ethernet Automatic Protection Switching (EAPS) protocol and a link aggregation protocol such as the multiple chassis link aggregation group (MLAG) protocol to achieve the following:

1.) Increased resiliency by reducing ring topology changes by the ring resiliency protocol for single link failure scenarios. Only double link failures incur ring resiliency protocol initiated topology changes and the network-impacting associated VPST (Virtual Port State Table) changes and FDB (Forwarding Database Table) flushes.

2.) Decreased network latency. Network latency is reduced by 50%, on average, in embodiments of the invention when a ring resiliency protocol such as the EAPS protocol and a link aggregation protocol such as the MLAG protocol are in use.

3.) Reduction of inter-switch communication (ISC) usage. The MLAG ISC links are not used during steady state (that is, when no link failures have occurred in the network) for transmitting unicast traffic flows.

Figure 2:
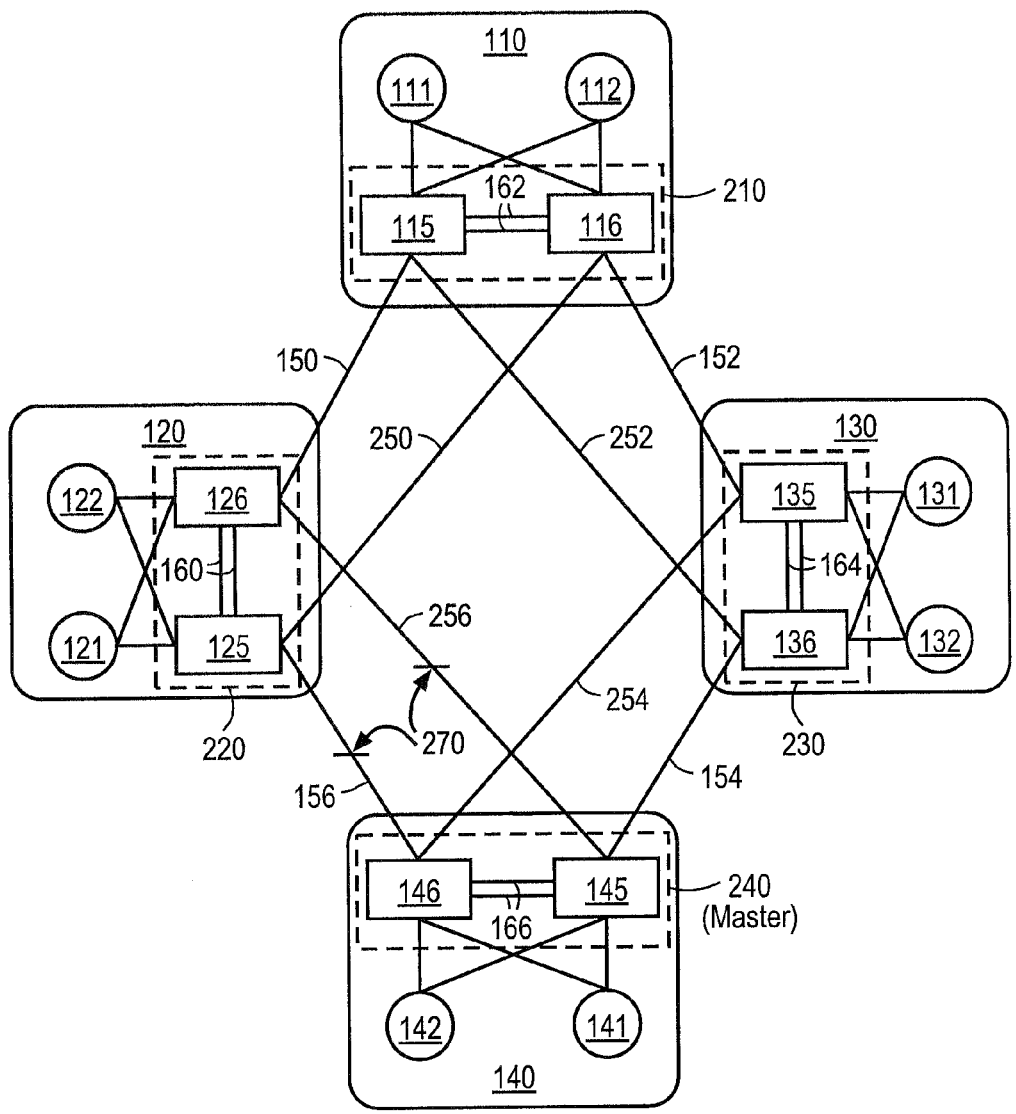
FIG. 2 illustrates an embodiment of the present invention.

Embodiments of the invention rely on a close coupling between the link aggregation protocol (e.g., an MLAG protocol) and the ring resiliency protocol (e.g., the EAPS protocol). In one embodiment of the invention, each pair of co-located MLAG switches, e.g., ring nodes 125 and 126, also coordinates ring resiliency protocol (e.g., EAPS) state information to form a logical ring spanning 2 switches at each logical hop. The diagram in FIG. 2 illustrates this embodiment. Network 200 comprises a pair of multiple link aggregation (e.g., MLAG) peer switches at each site or hop in the ring. These peer switches are connected either in a partial mesh (as shown) or in a full mesh with each other. For example, switch 125 is connected to switch 116 via physical link 250 in an MLAG logical link defined by the combination of individual physical links 150 and 250, while switch 126 is connected to switch 115 via physical link 150 in the same MLAG logical link defined by physical links 150 and 250.

When connected in a full mesh, each pair of ports from each MLAG peer switch additionally uses LAG to form an MLAG of LAGs. As an example of a full mesh connection, switch 125 would be connected to switch 115 via a separate physical link in addition to being connected to switch 116 via physical link 250 in the MLAG logical link defined by physical links 150 and 250, and switch 126 would be connected to switch 116 via a separate physical link in addition to being connected to switch 115 via physical link 150 in the same MLAG logical link. It should be noted that while the diagrams herein illustrate only a partially meshed configuration, embodiments of the invention equally apply to a fully meshed configuration.

In the embodiment illustrated in FIG. 2, each pair of MLAG switches at a site forms a logical ring resiliency protocol (e.g., EAPS) node. Each pair of MLAG switches either participates in the ring resiliency protocol master role or the ring resiliency protocol transit role. In the example network 200 illustrated in FIG. 2, site 120 comprising MLAG switches 125 and 126 form a ring resiliency protocol logical node 220. Further, ring resiliency protocol node 210 comprises MLAG switches 115 and 116, ring resiliency protocol logical node 230 comprises MLAG switches 135 and 136, and ring resiliency protocol logical node 240 comprises MLAG switches 145 and 146. Ring resiliency protocol logical node 240 is the ring resiliency protocol master node, while ring resiliency protocol logical nodes 210, 220 and 230 are ring resiliency protocol transit nodes. Much like EAPS version 1 "simple" ring topologies, the logical master node 240 blocks its logical secondary port in steady state, as depicted at 270. In actual implementation of an embodiment of the invention, when the logical secondary port is blocked, each corresponding individual port on MLAG switch 145 and 146 is blocked.

Figure 1:
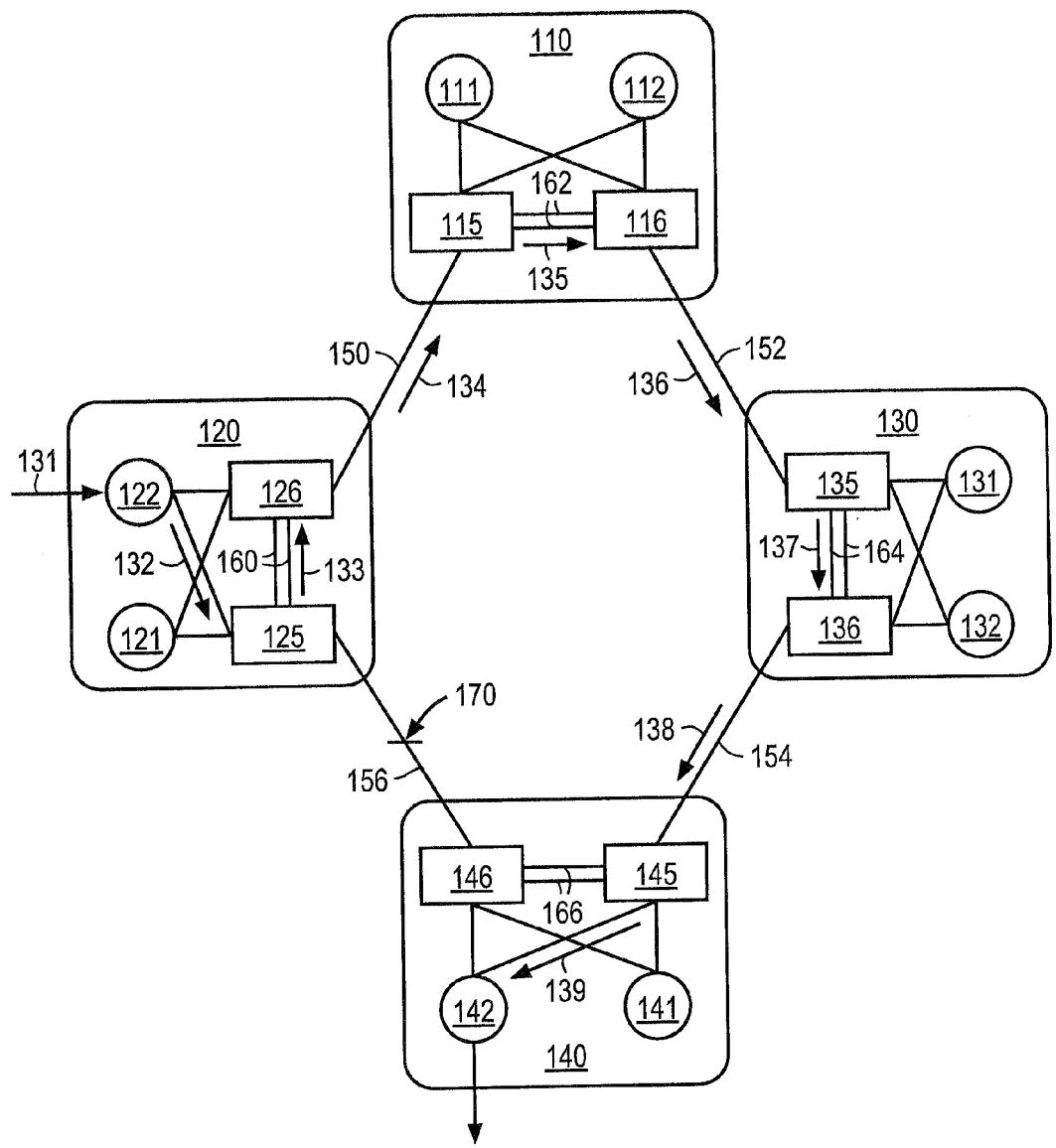
FIG. 1 illustrates a prior art data communications network.
Figure 3:
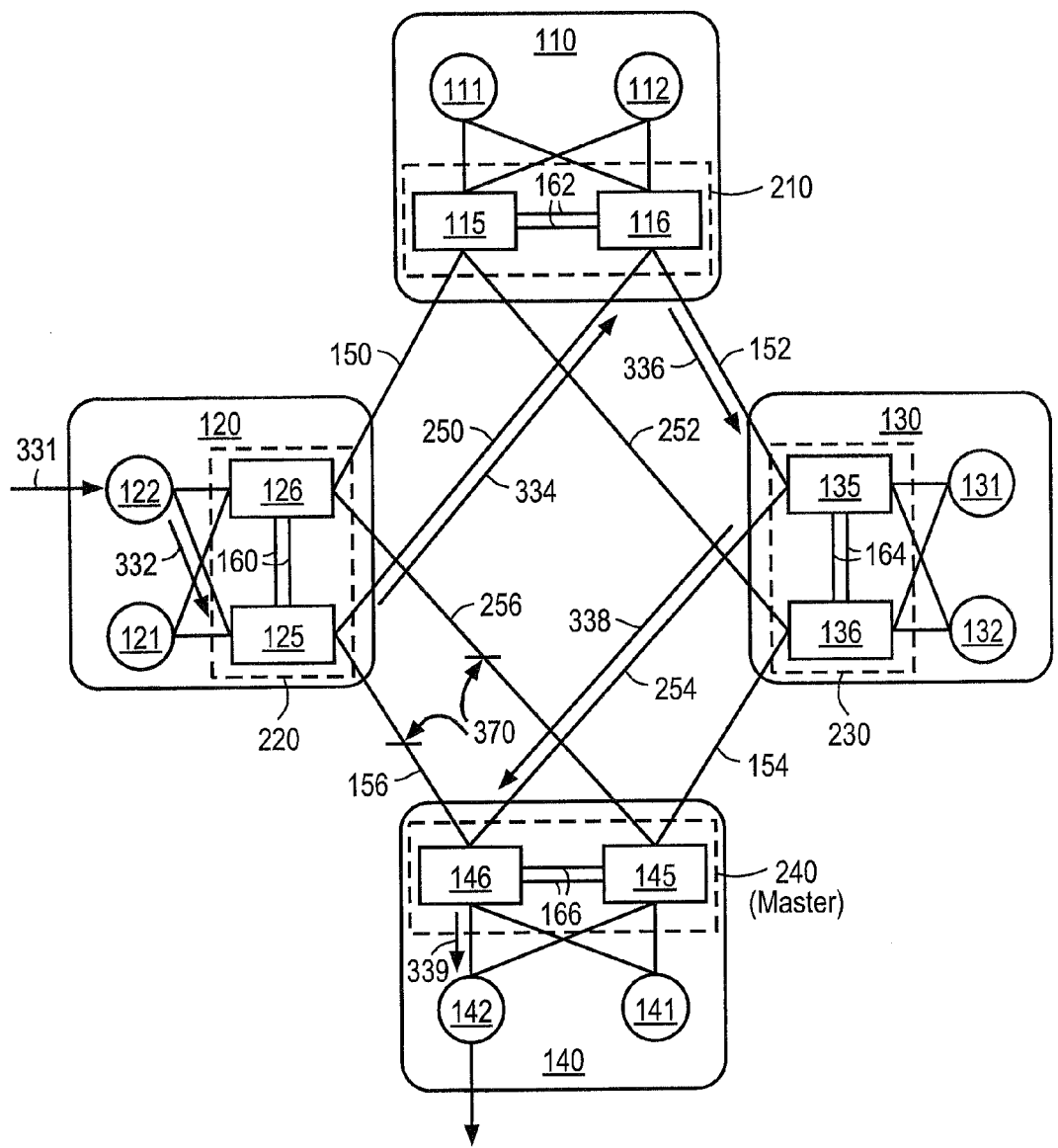
FIG. 3 illustrates traffic flow in an embodiment of the present invention.

The diagram illustrated in FIG. 3 highlights two of the above-mentioned advantages, decreased network latency, and reduction of ISC usage, for an exemplary packet flow, in network 300. As illustrated by arrows 331, 332, 334, 336, 338, and 339 in FIG. 3, packets from site 120 to site 140 that had previously traversed 7 ring nodes and 3 ISC links as illustrated in FIG. 1, now traverse only 4 rings nodes 125, 116, 135 and 146 and no ISC links; only 3 aggregated links ((150, 250), (152, 252) and (154, 254)) are traversed. Just as in the example network 200 illustrated in FIG. 2, ring resiliency protocol logical node 240 in network 300 is the ring resiliency protocol master node, while ring resiliency protocol logical nodes 210, 220 and 230 are ring resiliency protocol transit nodes, and the logical master node 240 blocks its logical secondary port in steady state, as depicted at 370.

Figure 4:
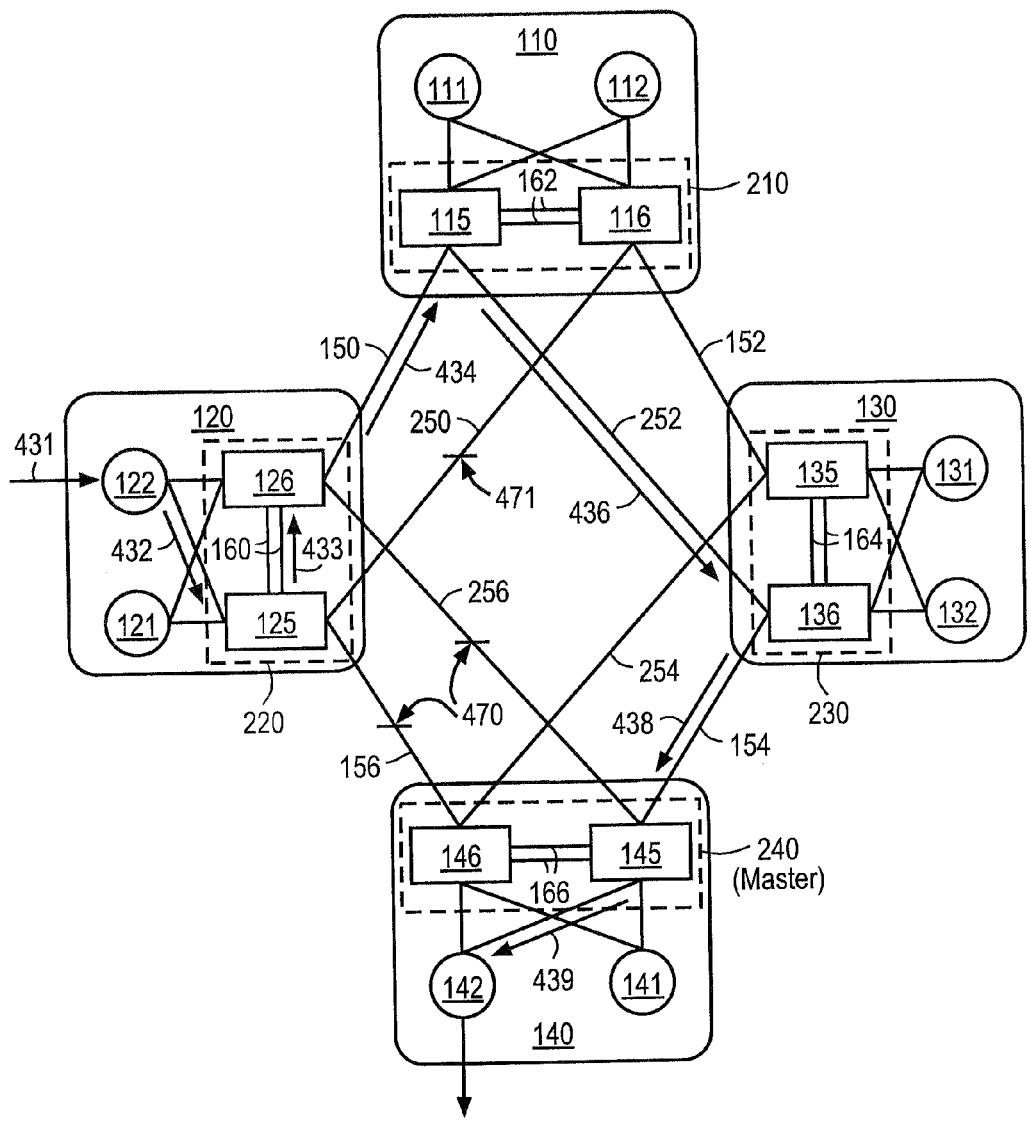
FIG. 4 illustrates a single link failure in an embodiment of the present invention.

When there is a single link failure in the network, the ring resiliency protocol does not need to take action since there is no failure in the logical ring. Instead, single link failures are handled by MLAG through its normal scheme of unblocking traffic received from the ISC and optionally redirecting traffic to the ISC. The diagram illustrated in FIG. 4 addresses a single link failure scenario with the failure occurring on physical link 250 as depicted at 471 on network 400. The diagram in FIG. 3 shows the original packet flow, while FIG. 4 shows the newly redirected packet flow as dictated by the MLAG-level convergence operation that takes place on switches 125 and 126. Packets now traverse ring nodes 125, 126, 115, 136, and 145, via ISC link 160 and the same three aggregated links as in FIG. 3. (links (150, 250), (152, 252) and (154, 254)). It should be appreciated that when a single link failure occurs at multiple, different, logical links within the ring, the same MLAG-only convergence mechanism is applied in each case. Only when there is a double link failure at a single logical link within the ring does a ring resiliency protocol topology change occur. Thus, just as in the example networks 200 and 300 illustrated in FIGS. 2 and 3, ring resiliency protocol logical node 240 continues to be the ring resiliency protocol master node, while ring resiliency protocol logical nodes 210, 220 and 230 are ring resiliency protocol transit nodes, and the logical master node 240 blocks its logical secondary port in steady state, as depicted at 470.

Figure 5:
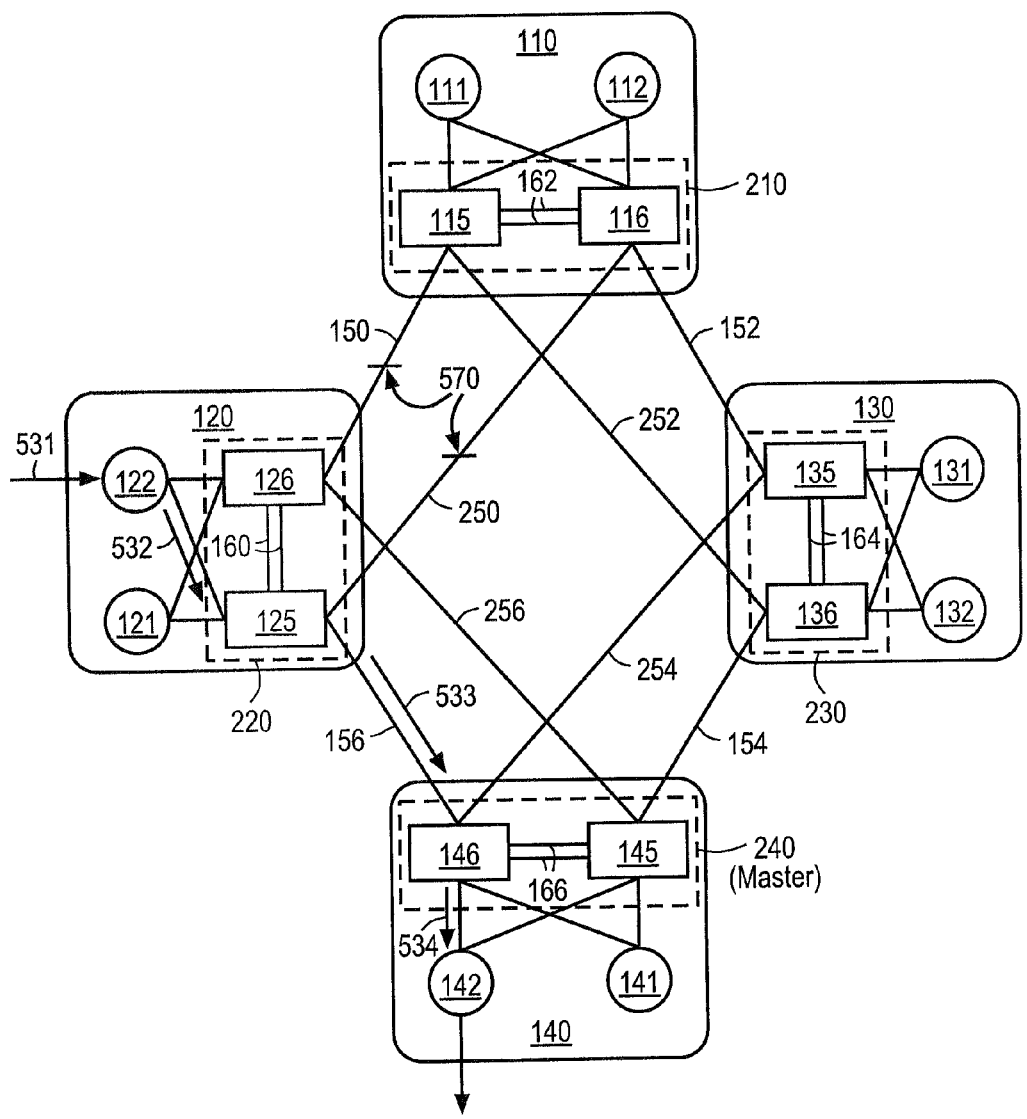
FIG. 5 illustrates a double link failure in an embodiment of the present invention.

The diagram in FIG. 5 illustrates a double link failure scenario and the associated ring resiliency protocol operations in network 500. Each pair of MLAG switches forms a single ring resiliency protocol logical node operating as either a master node or transit node. This embodiment allows for the pair of switches to negotiate "super" and "alternate" master or transit ring node roles. In one embodiment, this role negotiation is determined by the configured Internet Protocol (IP) address for each switch, where the switch with the lower IP address number becomes the "super" ring node, but it is appreciated that other options are possible in other embodiments. The ring node operating in the "super" role, whether it is a super-master role or a super-transit role, is responsible for:

Initiating all ring resiliency protocol packet transmissions;

Processing all received ring resiliency protocol packets, which may include such packets being proxy forwarded by an alternate ring node; and Initiating all VPST and FDB flush operations The ring node operating in the "alternate" role, whether it is an alternate-master role or an alternate-transit role, is responsible for:

Forwarding/checkpointing any received protocol packets to the super ring node;

Issuing local VPST or FDB flush operations as dictated by the super ring node; and Monitoring the health of the super ring node and, if communication fails, taking over the super ring node role.

In FIG. 5, double link failure occurs as depicted at 570, wherein both physical links 150 and 250 fail between sites 110 and 120. The ring resiliency protocol takes action and reconfigures the ring. In particular, the ring resiliency protocol logical master node 240 unblocks secondary ports of switches 145 and 146 respectively coupled to physical links 256 and 156 and performs FBD flushes at the switches. (Note the absence of the indication in FIG. 5, compared to FIG. 4, where logical master node 240 blocks its logical secondary port in steady state operation as depicted at 470). The other ring resiliency protocol nodes at site 120 then flush or adjust their respective forwarding databases (FDBs) also used for MLAG convergence so that the FDBs do not point toward the ISC links 160, as was the case in FIG. 4 with only a single link failure on link 250 depicted at 471 rather than the double link failures on links 150 and 250 depicted at 570. After reconfiguration, data packets transmitted from site 120 to site 140 traverse ring nodes 125 and 146, via the aggregated link defined by physical links 154 and 254.

Figure 6:
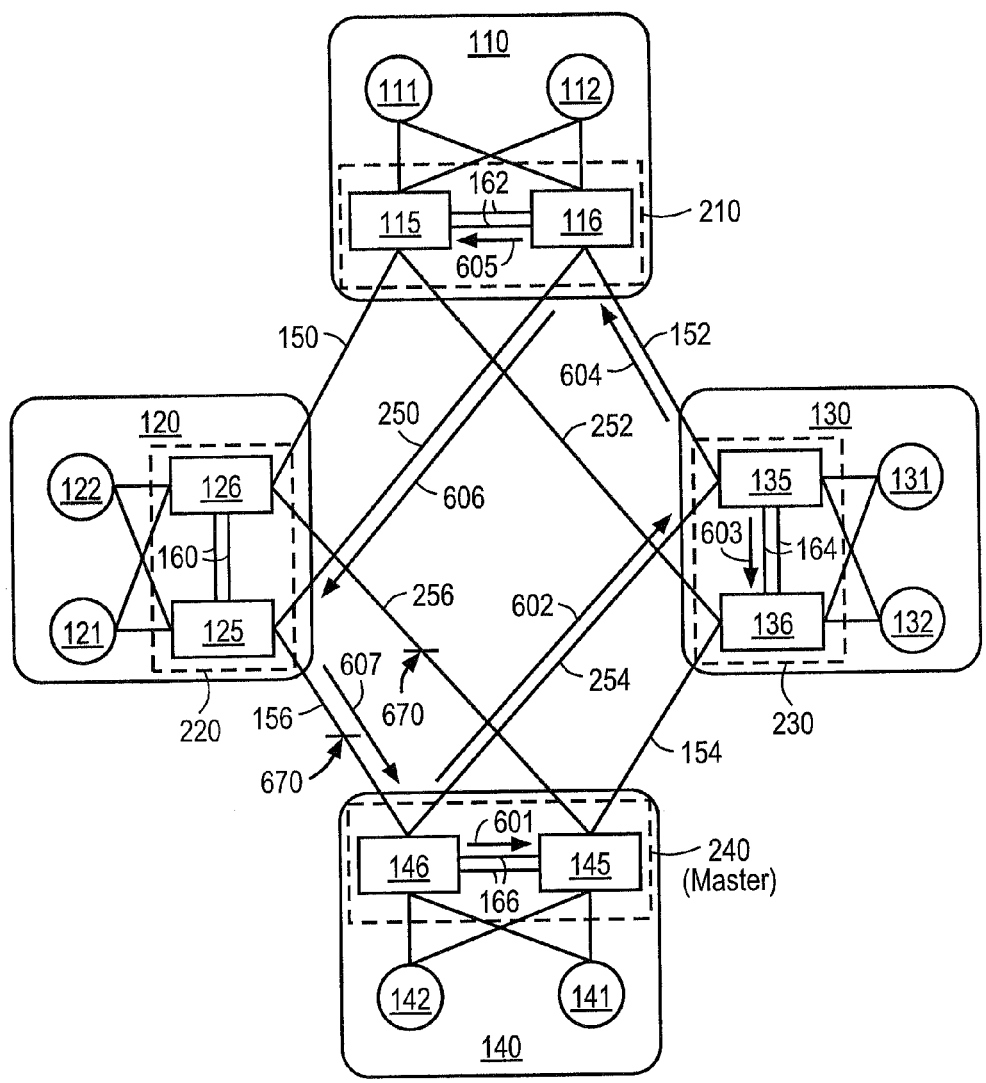
FIG. 6 illustrates a ring resiliency protocol operation in an embodiment of the present invention.

The diagram in FIG. 6 illustrates ring resiliency protocol (e.g., EAPS) packet transmission initiated by the ring-resiliency protocol super-master node in network 600. Aggregated link 156, 157 is blocked as depicted at 770. The arrows 601-607 indicate the direction of the ring resiliency protocol "Hello" protocol data units (PDUs) initiated from ring resiliency protocol super-master node 146. Note, that in addition to the normal ring resiliency protocol "Hello" PDUs transmitted by the master node on the primary port out links 154 and 254, the ring resiliency protocol super-master also transmits the same PDU on the ISC link 166 (at 601) to the ring resiliency protocol alternate master node 145. In steady state operation, that PDU is dropped via MLAG blocking after traversing the ISC link. In this manner, single link failures on any logical ring segment are handled through normal MLAG convergence mechanisms as described above.

Figure 7:
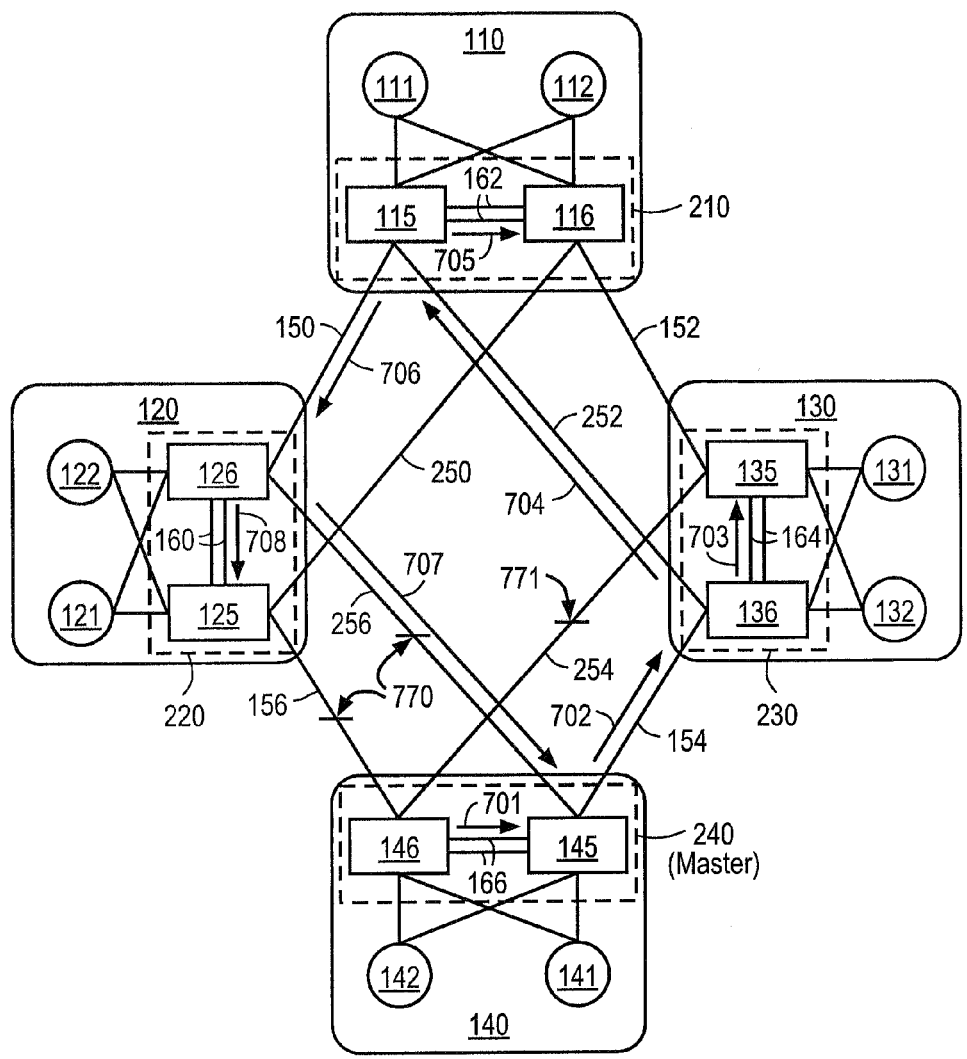
FIG. 7 illustrates a ring resiliency protocol operation when there is a single link failure in an embodiment of the present invention.

FIG. 7 provides a diagram illustrating ring resiliency protocol PDU transmissions, again from ring resiliency protocol super-master node 146, with a single link failure as depicted at 771 on physical link 254 of the aggregated link segment 154, 254. In this case, MLAG convergence is used to allow the "Hello" PDU to flow around the ring as depicted by arrows 701-708. The ring resiliency protocol super-master node transmits the PDUs on the primary port coupled to link 254 and on the ISC link 166. When the primary port is down, the ISC link is utilized. During a single failed link scenario, the alternate-master node 145 may receive the PDUs sent by the super-master node 146. However, even though the ring resiliency protocol super-master node 146 transmits the ring resiliency protocol "Hello" packet, it is the ring resiliency protocol alternate-master 145 that receives the PDU. The PDU is then checkpointed to the ring resiliency protocol super-master node for processing. Further, each ring resiliency protocol transit node floods the PDUs on the ring and on its associated ISC link. In steady state operation, the PDU is dropped via MLAG blocking after traversing the ISC link.

In the above description, numerous specific details are set forth. However, it is understood that embodiments of the invention may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention as discussed above may be implemented as a series of software routines executed by computer system. The software routines may comprise a plurality or series of instructions, code sequences, configuration information, or other data to be accessed and/or executed by a processing system such as one or more processors. Initially, the series of instructions, code sequences, configuration information, or other data may be stored in data storage and transferred to memory via a bus. It is to be appreciated that the series of instructions, code sequences, configuration information, or other data can be stored in a data storage using any conventional computer-readable or machine-accessible storage medium, such as a diskette, CD-ROM, magnetic tape, DVD, ROM, etc. The instructions, code sequences, configuration information, or other data may be copied from the data storage, such as mass storage, and accessed and executed by a processor.

In alternate embodiments, the present invention is implemented in discrete hardware or firmware. For example, one or more application specific integrated circuits (ASICs) could be programmed with some or all of the above-described functions of the present invention.

Accordingly, embodiments of an invention that improves ring resiliency, availability and performance in a network employing link aggregation techniques are described. From the foregoing description, those skilled in the art will recognize that many other variations of the present invention are possible. Thus, the present invention is not limited by the details described. Instead, the present invention can be practiced with modifications and alterations within the spirit and scope of the appended claims.

The invention claimed is:

1. A network comprising:
 a plurality of switches coupled via links in a ring topology, wherein:
  the plurality of switches are arranged into a first adjacent pair of switches and a second adjacent pair of switches;
  the first adjacent pair of switches are connected by a first multiple link aggregation group interswitch connection therebetween;
  the second adjacent pair of switches are connected by a second multiple link aggregation group interswitch connection therebetween;
  the first adjacent pair of switches and the second adjacent pair of switches each form a ring resiliency protocol logical node;
  a first switch in the first adjacent pair of switches is coupled via a first link to a first switch in the second adjacent pair of switches, and wherein a second switch in the first adjacent pair is coupled via a second link to a second switch in the second adjacent pair; and
  in the event of a failure of the first link, a packet flow to be transmitted from the first switch in the first adjacent pair over the first link is redirected from the first switch in the first adjacent pair to the second switch in the first adjacent pair, via the first multiple link aggregation group interswitch connection therebetween, for transmission from the second switch in the first adjacent pair over the second link to the second switch in the second adjacent pair.

2. The network of claim 1, wherein, in the event of a concurrent failure of the first link and the second link, a ring resiliency protocol is used to reconfigure the ring topology such that a packet flow to be transmitted via the failed links is redirected to a first switch in a third adjacent pair of switches via a third link.

3. The network of claim 1, wherein, in the event of the failure of the first link, the packet flow to be transmitted from the first switch in the first adjacent pair over the first link is redirected from the first switch in the first adjacent pair to the second switch in the first adjacent pair, via the first multiple link aggregation group interswitch connection therebetween, for transmission over the second link to the second switch in the second adjacent pair, according to a multiple link aggregation group protocol.

4. The network of claim 1, wherein, in the event of a concurrent failure of the first link and the second link, an EAPS ring resiliency protocol is used to reconfigure the ring topology such that a packet flow to be transmitted via the failed links is redirected to the first switch in a third adjacent pair of switches via a third link.

5. The network of claim 1, wherein, in the event of a concurrent failure of the first link and the second link, an ERPS ring resiliency protocol is used to reconfigure the ring topology such that a packet flow to be transmitted via the failed links is redirected to the first switch in a third adjacent pair of switches via a third link.

6. The network of claim 1, wherein one or both of the first link and the second link is an aggregated link.

7. A network comprising:
a plurality of switches coupled in a ring topology, wherein:
the plurality of switches are arranged into a first adjacent pair of switches and a second adjacent pair of switches;
the first adjacent pair of switches are connected by a first multiple link aggregation group interswitch connection therebetween;
the second adjacent pair of switches are connected by a second multiple link aggregation group interswitch connection therebetween;
the first adjacent pair of switches and the second adjacent pair of switches each form a ring resiliency protocol logical node;
a first switch in the first adjacent pair of switches coupled via a first link to a first switch in the second adjacent pair of switches, and coupled via a second link to a second switch in the second adjacent pair of switches;
a second switch in the first adjacent pair coupled via a third link to the first switch in the second adjacent pair, and coupled via a fourth link to the second switch in the second adjacent pair of switches; and
in the event of a concurrent failure of the first link and the second link, a packet flow to be transmitted from the first switch in the first adjacent pair over the first link or the second link is redirected from the first switch in the first adjacent pair to the second switch in the first adjacent pair, via the first multiple link aggregation group interswitch connection therebetween, for transmission from the second switch in the first adjacent pair over the third link to the first switch in the second adjacent pair or over the fourth link to the second switch in the second adjacent pair.

8. The network of claim 7, wherein in the event of an additional concurrent failure of the third link, a packet flow to be transmitted from the first switch in the first adjacent pair over the first link or the second link is redirected from the first switch in the first adjacent pair to the second switch in the first adjacent pair, via the first multiple link aggregation group interswitch connection therebetween, for transmission from the second switch in the first adjacent pair over the fourth link to the second switch in the second adjacent pair.

9. The network of claim 8, wherein in the event of additional concurrent failures of the third link and the fourth link, a ring resiliency protocol is used to reconfigure the ring topology such that a packet flow to be transmitted via the failed first, second, third, or fourth links is redirected to a first switch in a third adjacent pair of switches via a fifth link.

10. The network of claim 8, wherein the redirection from the first switch in the first adjacent pair to the second switch in the first adjacent pair via the first multiple link aggregation group interswitch connection therebetween is performed in accordance with a multiple link aggregation group protocol.

11. The network of claim 9, wherein the ring resiliency protocol to reconfigure the ring topology operates in accordance with Ethernet Automatic Protection Switching (EAPS) protocol.

12. A method to be performed by a first switch in a data communications network including a plurality of switches coupled via links in a ring topology, the method comprising:
forming a multiple link aggregation group interswitch connection between the first switch and an adjacent second switch in the plurality of switches;
forming a ring resiliency protocol logical node with the second switch;
in response to detecting a failure of a first link between the first switch and a third switch of the plurality of switches, redirecting a packet flow to be transmitted from the first switch over the first link to the second switch via the multiple link aggregation group interswitch connection for transmission from the second switch over a second link in the ring topology to a fourth switch adjacent the third switch.

13. The method of claim 12, wherein the fourth switch is coupled via a second multiple link aggregation group interswitch connection to the third switch.

14. The method of 12, the first switch participating in reconfiguring the ring topology via a ring resiliency protocol in the event of a concurrent failure of the first link and the second link, so that the packet flow to be transmitted from the first switch is redirected to a fifth switch via a third link in the ring topology.

15. The method of claim 12, wherein redirecting a packet flow to be transmitted from the first switch over the first link in the ring topology to the third switch instead to the second switch via the multiple link aggregation group interswitch connection is performed in accordance with a multiple link aggregation group protocol.

16. The method of claim 14, wherein the ring resiliency protocol operates in accordance to EAPS protocol.

17. The method of claim 14, wherein the ring resiliency protocol operates in accordance to ERPS protocol.

* * * * *